US011550711B2

(12) United States Patent
He et al.

(10) Patent No.: US 11,550,711 B2
(45) Date of Patent: Jan. 10, 2023

(54) DYNAMICALLY ADJUSTED GARBAGE COLLECTION WORKLOAD

(71) Applicant: Micron Technology, Inc., Boise, ID (US)

(72) Inventors: Deping He, Boise, ID (US); Nadav Grosz, Broomfield, CO (US); Qing Liang, Boise, ID (US); David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 239 days.

(21) Appl. No.: 16/565,066

(22) Filed: Sep. 9, 2019

(65) Prior Publication Data

US 2021/0073121 A1    Mar. 11, 2021

(51) Int. Cl.
*G06F 12/02* (2006.01)

(52) U.S. Cl.
CPC .. *G06F 12/0253* (2013.01); *G06F 2212/1044* (2013.01); *G06F 2212/7205* (2013.01)

(58) Field of Classification Search
CPC ......... G06F 12/0253; G06F 2212/1044; G06F 2212/7205
See application file for complete search history.

(56) References Cited

U.S. PATENT DOCUMENTS

| 8,364,918 | B1 * | 1/2013 | Smith | G06F 12/0246 711/159 |
| 8,843,712 | B1 * | 9/2014 | Smith | G06F 11/3419 711/159 |
| 2011/0113201 | A1 * | 5/2011 | Midda | G06F 12/122 711/133 |
| 2014/0215130 | A1 * | 7/2014 | Chen | G06F 1/3287 711/103 |
| 2015/0186160 | A1 * | 7/2015 | Arora | G06F 11/3423 713/1 |
| 2016/0041762 | A1 * | 2/2016 | Kanno | G06F 3/0653 711/103 |
| 2016/0350214 | A1 * | 12/2016 | Payer | G06F 16/289 |
| 2017/0351603 | A1 * | 12/2017 | Zhang | G06F 3/0604 |
| 2019/0310936 | A1 * | 10/2019 | Novogran | G06F 12/0246 |
| 2020/0349069 | A1 * | 11/2020 | Yu | G06F 3/0679 |

(Continued)

FOREIGN PATENT DOCUMENTS

JP    2018510432    *    4/2018

OTHER PUBLICATIONS

Wu et. al.;"GCaR: GC aware Cache Management with Improved Performance for Flash-based SSDs;" 2016; uta.edu; available at: https://ranger.uta.edu/~jiang/publication/Conferences/2016/2016-ICS-GCaR-%20Garbage%20Collection%20aware%20Cache%20Management%20with%20Improved%20Performance%20for%20Flash-based (Year: 2016).*

(Continued)

*Primary Examiner* — Prasith Thammavong

(74) *Attorney, Agent, or Firm* — Schwegman Lundberg & Woessner, P.A.

(57) ABSTRACT

Devices and techniques for a dynamically adjusting a garbage collection workload are described herein. For example, memory device idle times can be recorded. From these recorded idle times, a metric can be derived. A current garbage collection workload can be divided into portions based on the metric. Then, a first portion of the divided garbage collection workload can be performed at a next idle time.

24 Claims, 5 Drawing Sheets

(56) References Cited

U.S. PATENT DOCUMENTS

2022/0171713 A1* 6/2022 Malshe .................. G06F 12/10

OTHER PUBLICATIONS

Liu et. al.; "Raf: A Random Access First Cache Management to Improve SSD-Based Disk Cache;" Sep. 16, 2010; IEEE.com; available at: https://ieeexplore.ieee.org/document/5576139 (Year: 2010).*
Degenbaev, Ulan et. al.I "Idle Time Garbage Collection Scheduling;" Apr. 25, 2018; Google Germany; available at: https://web.archive.org/web/20180425100712/https://static.googleusercontent.com/media/research.google.com/en//pubs/archive/45361.pdf (Year: 2018).*

* cited by examiner

DYNAMICALLY ADJUSTED GARBAGE COLLECTION WORKLOAD

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), or magnetoresistive random-access memory (MRAM), among others.

Garbage collection is a process whereby invalid data segments are removed to free up the hardware holding the invalid data segments for new data. In memory devices with NAND storage arrays, garbage collection often involves copying valid (e.g., good) data in an erase segment—a unit that can be erased, such as a block—to a new location and erasing the erase segment. Once erased, the erase segment can then be used for new data. Thus, garbage collection plays an important role in maintaining free space on the NAND memory array.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
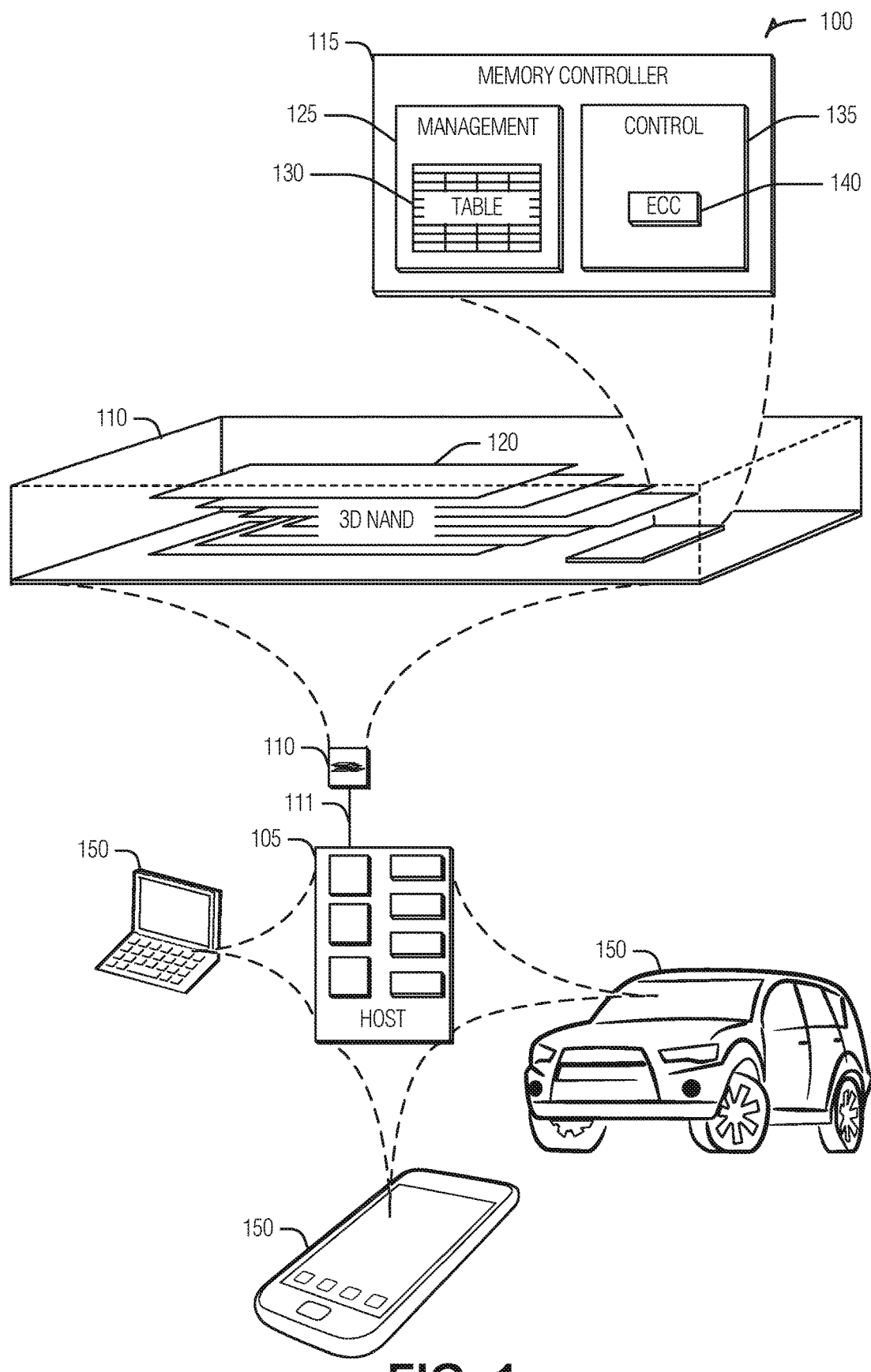
FIG. 1 illustrates an example of an environment including a memory device.

Garbage collection is not without costs. For example, because garbage collection involves reading valid data from one segment and writing it to another segment, garbage collection consumes memory device resources, such as power, internal connection resources, and controller time. Thus, if done concurrently with requests from a host, garbage collection can impact the user experience (e.g., by increasing write times). Moreover, the additional writes associated with garbage collection, known as write amplification, can impact the lifetime of the memory array. This occurs because NAND cells experience physical changes with a write, with typical NAND cells having a limited number of total writes before it is no longer effective to use. This wear on the NAND cells is accelerated when write amplification is high.

Some NAND-based memory devices use an SLC cache to speed host writes. The can be beneficial due to comparatively fast throughput of SLC writes versus MLC writes. For example, an SLC segment can support 500 megabits per second (MB/s) writes versus 150 MB/s throughput for TLC segment. Typically, the host writes are first written to the SLC cache and then migrated to the more densely encoded cells in the NAND array. Garbage collection periodically frees the SLC cache cells that have been migrated to enable additional fast host writes. Thus, using an SLC cache generally offers a much better user experience once the price of garbage collection is paid. There is, however, little benefit, and perhaps an issue, when a write workload routinely overruns the SLC cache. Here, the need to clear the cache imposes a performance penalty (e.g., reducing the benefit of the cache), and the additional write amplification used to copy the host data from the SLC cache to more densely encoded cells impacts the lifetime of the memory device.

Two different types of workloads can have conflicting optimization parameters in NAND devices, including those with an SLC cache: sustained workloads; and burst workloads. Sustained workloads can include high workload queue depth of reads or writes in which a significant amount of data (e.g., greater than the SLC cache if present) is transferred. Sometimes sustained workloads are part of performance testing regimes by the host. Burst workloads, typically experienced in devices that frequently enter a low-power mode, such as a mobile phone, IoT sensor, etc., typically have short stretches of heavy to moderate queue depth—when a device is awoken and used—followed by proportionally long periods of idle time.

In the context of garbage collection, these two different workload types can present some challenges. For example, to reduce write amplification, it can be beneficial to wait on garbage collection in a burst workload scenario because a long idle period can enable a single copy of valid data rather than multiple copies of valid data. However, in a sustained workload, there might not be such a large idle period in which to complete garbage collection. In this scenario, the NAND array can run out of free blocks, or host writes can be paused to enable the garbage collection to complete. Either of these outcomes can negatively impact the user experience when using the memory device.

The issues noted above can be addressed by a dynamically adjusted garbage collection workload. Here, the goal is to minimize the number of times garbage collection is run (e.g., to reduce write amplification) while attempting to perform garbage collection only during idle periods (e.g., to reduce the impact on user experience by the garbage collection). Because there is often no explicit signaling as to whether the memory device is being subjected to a sustained or burst workload, the size of atomically executed portions of the garbage collection workload is dynamically adjusted based on observed idle periods. Thus, burst workloads with long idle periods result in garbage collection workload portions that are large, while sustained workloads with typically small idle periods result in garbage collection portions that are small. Once the garbage collection workload is apportioned, its atomic pieces are executed as idle times present themselves.

Using this technique, it is likely that any given portion of the garbage collection workload will complete within the next idle time, which reduce the impact on the user experience for the garbage collection operation. Further, by likely consuming the entire idle period, each execution of a garbage collection portion can maximize the idle period to reduce the total number of garbage collection executions, thereby reducing write amplification. Additional examples and details are provided below.

To provide context for the memory device garbage collection system and techniques described herein, the following elements can be useful. Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" as discussed later herein. In such managed memory devices the controller functionality may be implemented on one or more die also incorporating a memory array, or on a separate die). In other examples, one or more memory devices may be combined with controller functionality to form a solid-stage drive (SSD) storage volume.

Embodiments of the present disclosure are described in the example of managed memory devices implementing NAND flash memory cells, termed of the disclosure, which may be implemented in other forms of memory devices and/or with other forms of storage technology.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Both SSDs and managed memory devices can include a number of memory devices, including a number oldies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

Figure 2:
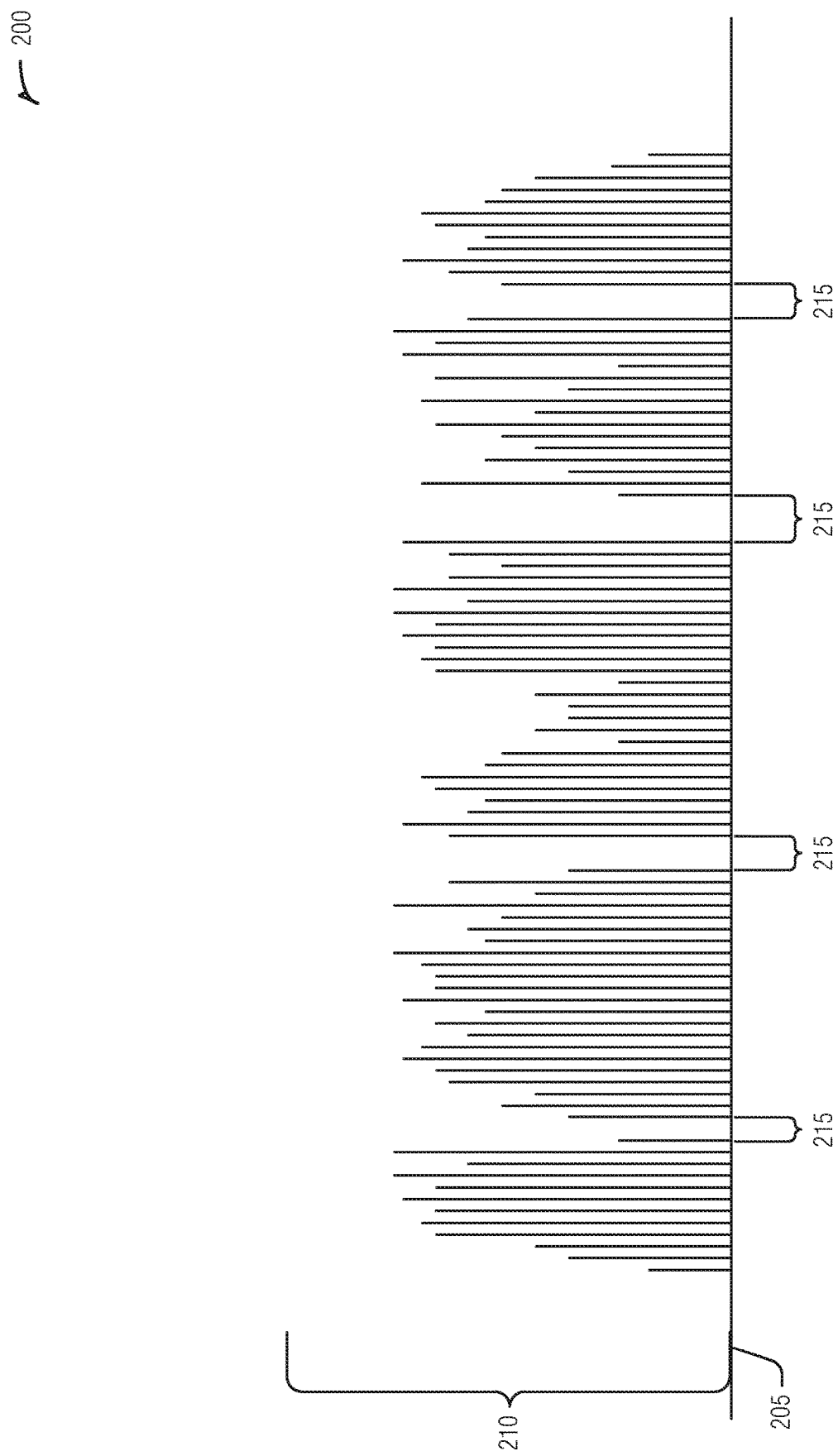
FIG. 2 illustrates an example of a high steady-state device workload.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150. FIG. 2 provides details more specific to the adjustable NAND write performance using pSLC encoding.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105. In these examples, the memory device 110 communicates with host device 105 components via an interlink 111, such as a bus. Thus, as described herein, a host, or host device 105 operation is distinct from those of the memory device 110, even when the memory device 110 is integrated into the host device 105.

One or more communication interfaces (e.g., the interlink 111) can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 500 of FIG. 5.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. Although the memory controller 115 is here illustrated as part of the memory device 110 package, other configurations can be employed, such as the memory controller 115 being a component of the host 105 (e.g., as a discrete package on a system-on-a-chip of the host 105 that is separate from the memory service 110), or even implemented via a central processing unit (CPU) of the host 105.

The memory manager 125 can include, among other things, circuitry or firmware, such as several components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling, garbage collection, reclamation, error detection or correction, block retirement, or one or more other memory management functions. The memory manager 125 can parse or format host commands (e.g., commands received from a host) into device commands (e.g., commands associated with operation of the memory array 120, etc.), or generate device commands (e.g., to accomplish various memory management functions) for the array controller 135 or one or more other components of the memory device 110.

As noted above, the memory manager 125 can be responsible for garbage collection. To implement dynamic garbage collection workloads, the memory manager 125 is configured to record idle times for the memory device 110. In an example, an idle time is any time beyond a threshold in which a command queue for the memory controller 110 is empty. In an example, the threshold is ten milliseconds. Other idle triggers can include a command queue having less than a threshold number of commands, or less than a threshold amount of data being read or written.

In an example, to record the idle times, the memory manager 125 is configured to maintain a data structure (e.g., a log) in which entries include a duration of an idle time. In an example, the entries also include a time or date in which the idle time was recorded. Recording the time or date can enable analytics to predict idle periods, which can be helpful to partition or order the garbage collection workload as noted below.

The memory manager 125 is configured to derive a metric from the recorded idle times. In an example, the metric is an average of idle time durations. In an example, the average is a weighted average that is weighted by age of the entries. In an example, the weighted average is computed by:

$$\sum_{i=1}^{n} \frac{L_i}{i}$$

where n is the number of idle times being considered and L is a length of an idle time. For example, if the idle record has ten entries L1, L2, ..., L10, where L1 is the most recent entry, the weighting is calculated by $$L1 + \frac{L2}{2} + \frac{L3}{3} + \cdots + \frac{L10}{10}.$$

This weighting can be used directly for partitioning a garbage collection workload by, for example, multiplying the weighting against the available garbage collection work to do to select the amount of work to do during a next idle period.

In an example, a contiguous subset of all idle times, which includes a last idle time, are used to derive the metric. Here, the subset represents a sliding window in which older idle time entries are not considered. This enables changes in workload types, e.g., from sustained to burst, to be effectively managed by "forgetting" idle period characteristics that are outside of the window.

In an example, a ratio between idle time and busy time is calculated for the memory device as part of deriving the metric. Such as ratio can help to determine whether the current workload more closely resembles a burst type workload or a sustained type workload. When the ratio of idle time to busy time is high, then the memory device 110 is likely experiencing a burst workload. When the ratio is low, then it is more likely a sustained workload.

In an example, an idle rate is calculated as part of deriving the metric. In an example, the idle rate is determined from an input-output event counter of the memory device. The idle rate is akin to the idle time ratio discussed above in that it characterizes an aspect of the idle pattern. Thus, if the idle rate is high, there are more opportunities to execute a garbage collection workload. However, as noted above, it is often undesirable to run garbage collection whenever an idle period occurs as this can increase write amplification.

The memory manager 125 is configured to divide a current garbage collection workload into portions based on the metric. Here, a garbage collection workload is a measure, or estimate, of operations to free space in the memory array 120. Division of the garbage collection workload entails dividing these operations into groups, where operations in a group are performed at one time (e.g., either serially or in parallel).

In an example, not all operations within the garbage collection workload are equally effective in balancing a reduction in write amplification, reducing impact on the user experience, and freeing space on the memory array 120. For example, operations that free an SLC cache can have a greater impact on increasing host 105 write performance. Thus, in an example, the portions of the garbage collection workload are sorted such that garbage collection of a write cache (e.g., SLC cache) is prioritized. Other orderings can also be used, such as to maximize free space, minimize write amplification, etc.

The memory manager 125 is configured to perform a first portion of the portions of the garbage collection workload at a next idle time. When the portions are ordered, the first portion represents the garbage collection operations with the highest value in the ordering used. In this way, the most effective garbage collection operations are performed first. In an example, the portions are randomized, the first portion being a first randomly selected portion. Here, when no explicit preference of garbage collection operations exists (e.g., it is unknown or they are all equal given known information), then randomization can guard against algorithmic problems that can occur.

In an example, the memory manager 125 is configured to verify that the first portion is beyond a threshold based on the metric before executing it. Thus, if the garbage collection portion is not beyond the threshold, then the portion will not be performed. This addresses an issue that can occur when the idle periods are small. Here, the division of the garbage collection workload can result in a portion that is so small, the effect of running the workload is negligible with respect to freeing space (e.g., it is equivalent to not running the workload at all) and can consume too much time or power to complete. By using this threshold, the memory manager 125 can determine whether to skip executing the workload portion to provide a better overall performance for the memory device 110. The determination, described above, of whether the memory device 110 is experiencing a burst or a sustained workload can be used to establish the threshold. For example, if the memory device 110 is experiencing a sustained workload, then smaller portions can be tolerated because it will likely extend the amount of time the sustained workload can be processed before an interruption to perform necessary garbage collection. In contrast, during a burst workload, it is likely that an extended idle period is approaching in which a new apportionment of garbage collection tasks will result in a more effective garbage collection execution. Both the ratio of idle to busy times, as well as the frequency of idle periods can be used to make this assessment and adjust the threshold.

The dynamic garbage collection workload techniques described herein offer sever advantages to other approaches. For example, traditional garbage collection often simply executes a fixed number of operations at an idle period or when free space drops below a threshold. The first approach can under utilize a long idle period and impact the user experience during short idle periods. Moreover, if run on a schedule, write amplification can be a problem. Other approaches, such as mapping a frequency of activity to predict future idle periods can be computationally expensive and still fail to properly address realistic workloads that fit idle periods. Instead, the idle period averaging technique provides a computationally efficient way to maximizes workloads that still fit into likely idle periods.

Time window or weighted techniques enable monitoring and garbage collection workload division faculty to dynamically adjust to changing workloads, such as from a sustained to a burst workload or back again. For example, if idle times are short, the memory device 110 is being heavily used (e.g., a sustained workload), perhaps by a benchmark, a restore, streaming media, etc. Here, it can be good to suppress garbage collection to limit its impact on the device performance, enabling better user experience and reduced impact on the heavy workload. This is accomplished because the weighting function produces a small value due to the small idle periods, resulting in small garbage collection workload portions. If, however, idle times are large, the memory device 110 is not being heavily used (e.g., a burst workload).

In this case, it is appropriate to do a lot of garbage collection work during an idle period, as it won't interfere with the user experience. In the case of an SLC cache architecture, large garbage collection portions can clear most, or all, of the SLC cache to enable the highest user performance at a next burst.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 can include translation tables or a logical-to-physical (L2P) mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (KC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host 105 and the memory device 110 or maintain integrity of stored data. Part of this integrity maintenance can include removing (e.g., retiring) failing memory resources (e.g., memory cells, memory arrays, pages, blocks, etc.) to prevent future errors. RAIN is another technique that can be employed by the memory device 110 to maintain data integrity. The array controller 135 can be arranged to implement RAIN parity data generation and storage in the array 120. The memory controller 115 can be involved in using the parity data to reconstruct damaged data.

The memory array 120 can include several memory cells arranged in, for example, devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

FIG. 2 illustrates an example of a high steady-state device workload 200. As illustrated, the command queue depth 210 is represented over time 205. Here, a steady-state, or sustained, memory device workload is indicated by the small size (e.g., time 205) corresponding to the idle periods 215. As noted above, in this scenario, the garbage collection workload will be divided into similarly small portions that are likely to be completed during the idle periods 215.

Figure 3:
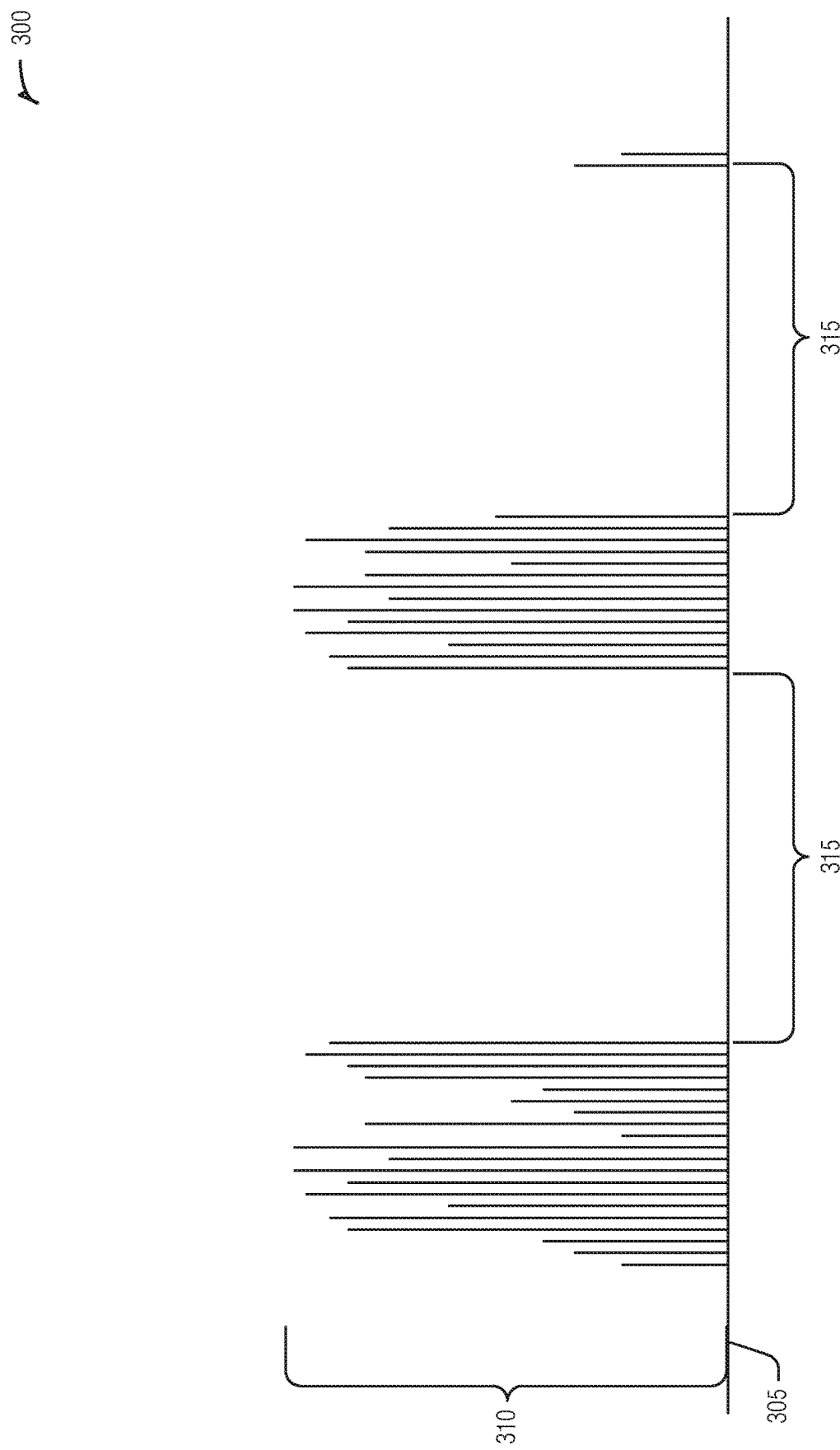
FIG. 3 illustrates an example of a burst device workload.

FIG. 3 illustrates an example of a burst device workload 300. Again, the command queue depth 310 is plotted over time 305. Note, in the burst workload 300, the idle periods 315 are much larger than the idle periods 215 illustrated in FIG. 2. This will result in comparatively large garbage collection workload portions to be run during the idle periods 315. Also, note that the ratio of busy periods to idle periods 215 and 315 is inverted between the sustained workload 200 and the burst workload 300. As noted above, this ratio can be used to determine what type of workload the memory device is subjected to, and can further influence how the garbage collection workload is divided, or whether or not to even run a portion of the garbage collection workload during a next idle period 215 or 315.

Figure 4:
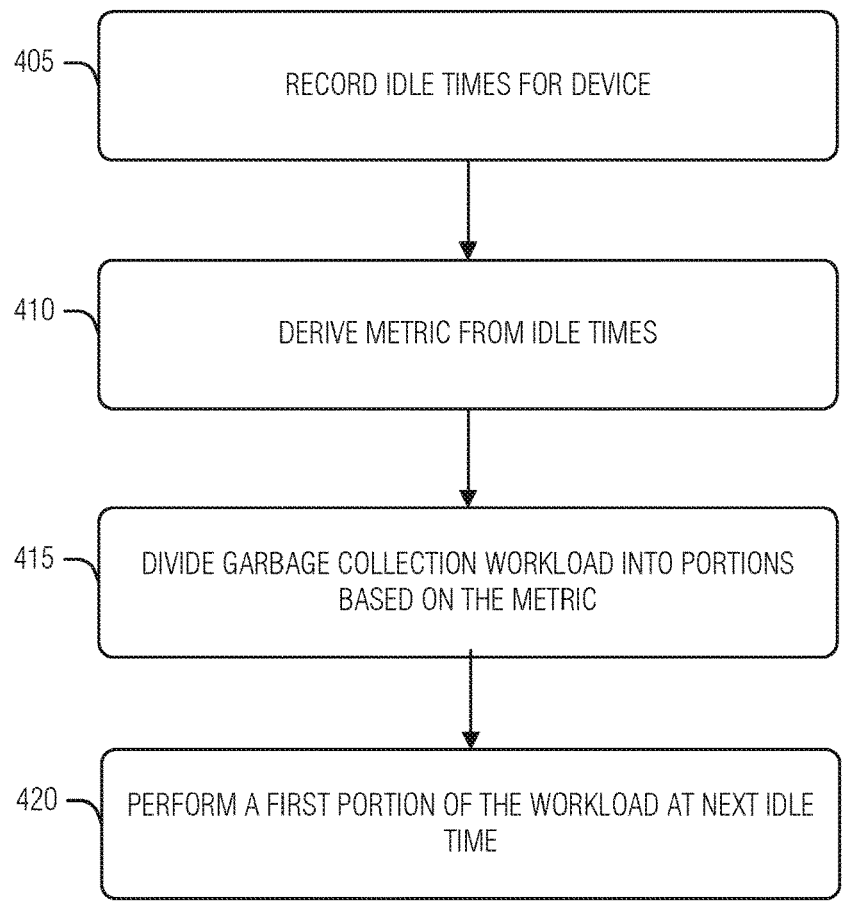
FIG. 4 illustrates a flowchart of an example of a method for dynamically adjusting a garbage collection workload.

FIG. 4 illustrates a flowchart of an example of a method 400 for dynamically adjusting a garbage collection workload. The operations of the method 400 are performed by computing hardware. An example of such computing hardware can include the memory controller 115 or other processing circuitry of the memory device 110 described above with respect to FIG. 1, other computer components, such as an external memory controller.

At operation 405, idle times for a memory device are recorded. In an example, the recordation includes a log of idle times. In an example, entries in the log include a length of the idle time.

At operation 410, a metric is derived from the recorded idle times. In an example, a contiguous subset of all idle times, which includes a last idle time, are used to derive the metric. This is a form of sliding window.

In an example, a ratio between idle time and busy time is calculated for the memory device as part of deriving the metric.

In an example, an idle rate is calculated as part of deriving the metric. In an example, the idle rate is determined from an input-output event counter of the memory device. In this example, the recordation of operation 405 can be an update of the event counter rather than maintaining a log of idle events.

In an example, an average of the idle times can be computed as part of the metric derivation. Here, to average the idle times means to average the lengths of the idle times. In an example, the average is a weighted average that is weighted by age. In an example, the weighted average is computed by:

$$\sum_{i=1}^{n} \frac{L_i}{i}$$

where n is the number of idle times being considered and L is a length of an idle time.

At operation 415, a current garbage collection workload can be divided into portions based on the metric. In an example, the portions of the garbage collection workload are sorted such that garbage collection of a write cache is prioritized. In an example, wherein the write cache is an SLC write cache.

At operation 420, a first portion of the portions (from operation 415) of the garbage collection workload are performed at a next idle time. In an example, to perform the first portion of the portions at a next idle time includes verifying that the first portion is beyond a threshold based on the metric. In an example, if the garbage collection portion is not beyond the threshold, then the portion will not be performed.

Figure 5:
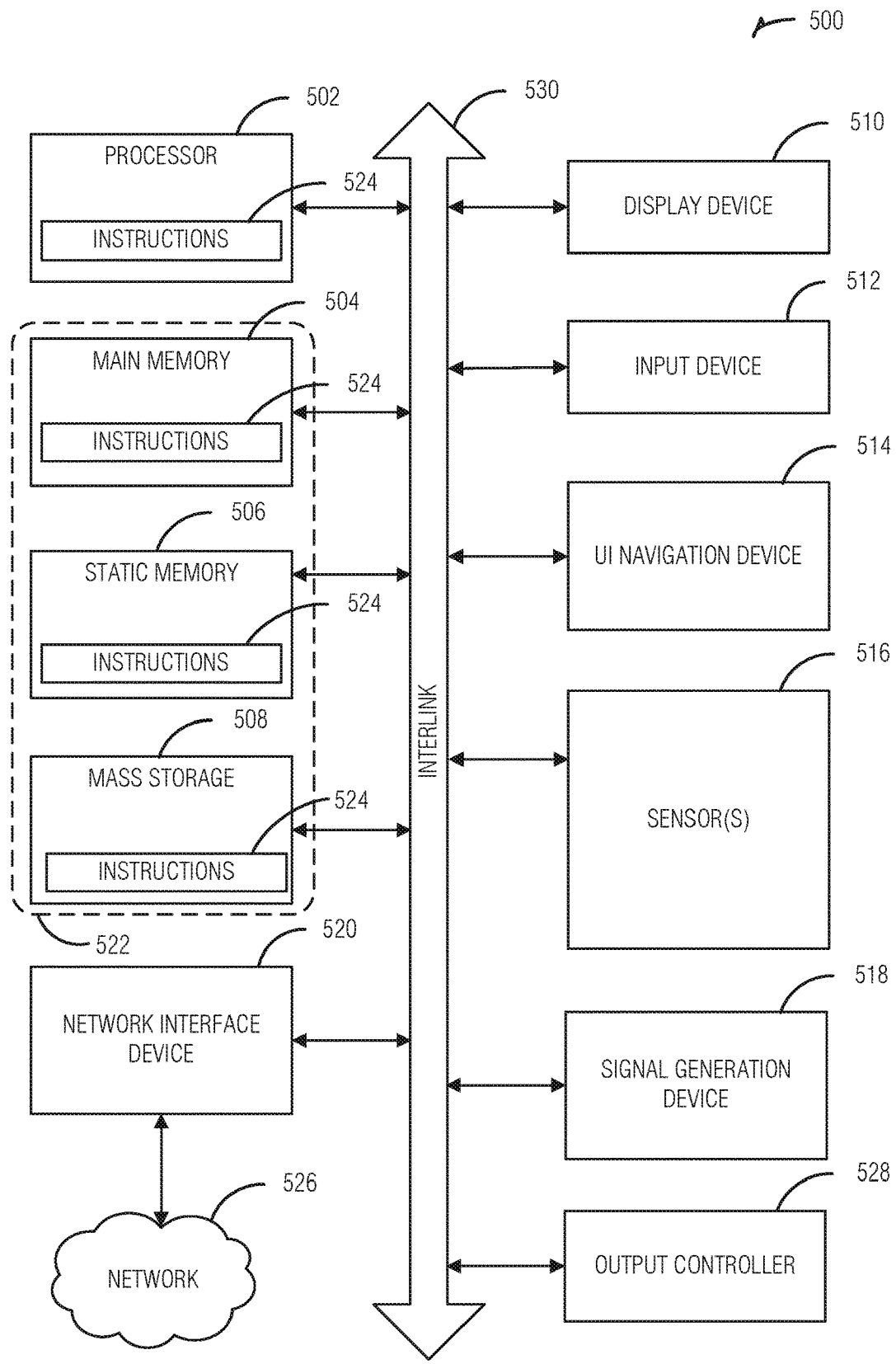
FIG. 5 is a block diagram illustrating an example of a machine upon which one or more embodiments can be implemented.

FIG. 5 illustrates a block diagram of an example machine 500 upon which any one or more of the techniques (e.g., methodologies) discussed herein can perform. In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) can include a hardware processor 502 (e.g., a central processing unit (CPU), a graphics processing unit (GPU), a hardware processor core, or any combination thereof, such as the memory controller 115, etc.), a main memory 504 and a static memory 506, some or all of which can communicate with each other via an interlink (e.g., bus) 508. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 508 can include a machine readable medium 522 on which is stored one or more sets of data structures or instructions 524 (e.g., software) embodying or utilized by any one or more of the techniques or functions described herein. The instructions 524 can also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 508 can constitute the machine readable medium 522.

While the machine readable medium 522 is illustrated as a single medium, the term "machine readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces.

Universal Flash Storage (UFS) devices, including controllers and firmware, communicate with a host device using a low-voltage differential signaling (LVDS) serial interface with dedicated read/write paths, further advancing greater read/write speeds.

The instructions 524 can further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as those defined by the Third Generation Partnership Project (3GPP) families of standards (e.g., 3G, 4G, 5G, Long Term Evolution (LTE), etc.), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the communications network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that can store, encoding or carrying instructions for execution by the machine 500, and includes digital or analog communications signals or other intangible medium to facilitate communication of such software.

ADDITIONAL NOTES & EXAMPLES

Example 1 is a memory device to implement a dynamically adjusted garbage collection workload, the memory device comprising: processing circuity; and storage that includes instructions, the instructions, when executed by the processing circuitry, configured the processing circuitry to: record idle times for a memory device; derive a metric from the idle times; divide a current garbage collection workload into portions based on the metric; and perform a first portion of the portions at a next idle time.

In Example 2, the subject matter of Example 1, wherein, to derive the metric from the idle times, the processing circuitry is configured by the instructions to use a contiguous subset of all idle times that includes a last idle time.

In Example 3, the subject matter of any of Examples 1-2, wherein, to derive the metric from the idle times, the processing circuitry is configured by the instructions to compute an average of the idle times.

In Example 4, the subject matter of Example 3, wherein the average is a weighted average that is weighted by age.

In Example 5, the subject matter of Example 4, wherein the weighted average is computed by: $\sum_{i=1}^{n} L_i/i$ where, n is a number of idle times being considered and Lisa length of an idle time.

In Example 6, the subject matter of any of Examples 1-5, wherein, to derive the metric from the idle times, the processing circuitry is configured by the instructions to calculate an idle rate.

In Example 7, the subject matter of Example 6, wherein the idle rate is determined from an input-output event counter of the memory device.

In Example 8, the subject matter of any of Examples 1-7, wherein, to derive the metric from the idle times, the processing circuitry is configured by the instructions to calculate a ratio between idle time and busy time for the memory device.

In Example 9, the subject matter of any of Examples 1-8, wherein the portions of the garbage collection workload are sorted such that garbage collection of a write cache is prioritized.

In Example 10, the subject matter of Example 9, wherein the write cache is a single-level-cell (SLC) write cache.

In Example 11, the subject matter of any of Examples 1-10, wherein, to perform a first portion of the portions at a next idle time, the processing circuitry is configured by the instructions to verify that the first portion is beyond a threshold based on the metric.

Example 12 is a method for dynamically adjusted garbage collection workload, the method comprising: recording idle times for a memory device; deriving a metric from the idle times; dividing a current garbage collection workload into portions based on the metric; and performing a first portion of the portions at a next idle time.

In Example 13, the subject matter of Example 12, wherein deriving the metric from the idle times includes using a contiguous subset of all idle times that includes a last idle time.

In Example 14, the subject matter of any of Examples 12-13, wherein deriving the metric from the idle times includes computing an average of the idle times.

In Example 15, the subject matter of Example 14, wherein the average is a weighted average that is weighted by age.

In Example 16, the subject matter of Example 15, wherein the weighted average is computed by:

$$\sum_{i=1}^{n} \frac{L_i}{i}$$

where, n is a number of idle times being considered and L is a length of an idle time.

In Example 17, the subject matter of any of Examples 12-16, wherein deriving the metric from the idle times includes calculating an idle rate.

In Example 18, the subject matter of Example 17, wherein the idle rate is determined from an input-output event counter of the memory device.

In Example 19, the subject matter of any of Examples 12-18, wherein deriving the metric from the idle times includes calculating a ratio between idle time and busy time for the memory device.

In Example 20, the subject matter of any of Examples 12-19, wherein the portions of the garbage collection workload are sorted such that garbage collection of a write cache is prioritized.

In Example 21, the subject matter of Example 20, wherein the write cache is a single-level-cell (SLC) write cache.

In Example 22, the subject matter of any of Examples 12-21, wherein performing a first portion of the portions at a next idle time includes verifying that the first portion is beyond a threshold based on the metric.

Example 23 is a machine-readable medium including instructions to implement dynamically adjusted garbage collection workload, the instructions, when executed by processing circuitry, cause the processing circuitry to perform operations comprising: recording idle times for a memory device; deriving a metric from the idle times; dividing a current garbage collection workload into portions based on the metric; and performing a first portion of the portions at a next idle time.

In Example 24, the subject matter of Example 23, wherein deriving the metric from the idle times includes using a contiguous subset of all idle times that includes a last idle time.

In Example 25, the subject matter of any of Examples 23-24, wherein deriving the metric from the idle times includes computing an average of the idle times.

In Example 26, the subject matter of Example 25, wherein the average is a weighted average that is weighted by age.

In Example 27, the subject matter of Example 26, wherein the weighted average is computed by:

$$\sum_{i=1}^{n} \frac{L_i}{i}$$

where, n is a number of idle times being considered and L is a length of an idle time.

In Example 28, the subject matter of any of Examples 23-27, wherein deriving the metric from the idle times includes calculating an idle rate.

In Example 29, the subject matter of Example 28, wherein the idle rate is determined from an input-output event counter of the memory device.

In Example 30, the subject matter of any of Examples 23-29, wherein deriving the metric from the idle times includes calculating a ratio between idle time and busy time for the memory device.

In Example 31, the subject matter of any of Examples 23-30, wherein the portions of the garbage collection workload are sorted such that garbage collection of a write cache is prioritized.

In Example 32, the subject matter of Example 31, wherein the write cache is a single-level-cell (SLC) write cache.

In Example 33, the subject matter of any of Examples 23-32, wherein performing a first portion of the portions at a next idle time includes verifying that the first portion is beyond a threshold based on the metric.

Example 34 is a system to implement a dynamically adjusted garbage collection workload, the system comprising: means for recording idle times for a memory device; means for deriving a metric from the idle times; means for dividing a current garbage collection workload into portions based on the metric; and means for performing a first portion of the portions at a next idle time.

In Example 35, the subject matter of Example 34, wherein the means for deriving the metric from the idle times include means for using a contiguous subset of all idle times that includes a last idle time.

In Example 36, the subject matter of any of Examples 34-35, wherein the means for deriving the metric from the idle times include means for computing an average of the idle times.

In Example 37, the subject matter of Example 36, wherein the average is a weighted average that is weighted by age.

In Example 38, the subject matter of Example 37, wherein the weighted average is computed by:

$$\sum_{i=1}^{n} \frac{L_i}{i}$$

where, n is a number of idle times being considered and L is a length of an idle time.

In Example 39, the subject matter of any of Examples 34-38, wherein the means for deriving the metric from the idle times include means for calculating an idle rate.

In Example 40, the subject matter of Example 39, wherein the idle rate is determined from an input-output event counter of the memory device.

In Example 41, the subject matter of any of Examples 34-40, wherein the means for deriving the metric from the idle times include means for calculating a ratio between idle time and busy time for the memory device.

In Example 42, the subject matter of any of Examples 34-41, wherein the portions of the garbage collection workload are sorted such that garbage collection of a write cache is prioritized.

In Example 43, the subject matter of Example 42, wherein the write cache is a single-level-cell (SLC) write cache.

In Example 44, the subject matter of any of Examples 34-43, wherein the means for performing a first portion of the portions at a next idle time include means for verifying that the first portion is beyond a threshold based on the metric.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device to implement a dynamically adjusted garbage collection workload, the memory device comprising:
   processing circuitry; and
   storage that includes instructions, the instructions, when executed by the processing circuitry, configured the processing circuitry to:
   record idle times for a memory device;
   derive a metric from the idle times including computing a weighted average of the idle times, the weighted average computed by:

$$\sum_{i=1}^{n} \frac{L_i}{i}$$

where, n is a number of idle times being considered and L is a length of an idle time;
   divide a current garbage collection workload into portions based on the metric, wherein the portions are atomic and a group of multiple operations, a size of the group being determined by the metric; and
   perform, to completion, a first portion of the portions at a next idle time, wherein the first portion is beyond a threshold size.

2. The memory device of claim 1, wherein, to derive the metric from the idle times, the processing circuitry is configured by the instructions to use a contiguous subset of all idle times that includes a last idle time.

3. The memory device of claim 1, wherein, to derive the metric from the idle times, the processing circuitry is configured by the instructions to calculate an idle rate.

4. The memory device of claim 3, wherein the idle rate is determined from an input-output event counter of the memory device.

5. The memory device of claim 1, wherein the portions of the current garbage collection workload are sorted such that garbage collection of a write cache is prioritized.

6. The memory device of claim 5, wherein the write cache is a single-level-cell (SLC) write cache.

7. The memory device of claim 1, wherein, to derive the metric from the idle times, the processing circuitry is configured by the instructions to calculate a ratio between idle time and busy time for the memory device.

8. The memory device of claim 1, wherein, to perform the first portion of the portions at a next idle time, the processing circuitry is configured by the instructions to verify that the first portion is beyond the threshold size based on the metric.

9. A method for dynamically adjusted garbage collection workload, the method comprising:
recording idle times for a memory device;
deriving a metric from the idle times including computing a weighted average of the idle times, the weighted average computed by:

$$\sum_{i=1}^{n} \frac{L_i}{i}$$

where, n is a number of idle times being considered and L is a length of an idle time;
dividing a current garbage collection workload into portions based on the metric, wherein the portions are atomic and a group of multiple operations, a size of the group being determined by the metric; and
performing, to completion, a first portion of the portions at a next idle time, wherein the first portion is beyond a threshold size.

10. The method of claim 9, wherein deriving the metric from the idle times includes using a contiguous subset of all idle times that includes a last idle time.

11. The method of claim 9, wherein deriving the metric from the idle times includes calculating an idle rate.

12. The method of claim 11, wherein the idle rate is determined from an input-output event counter of the memory device.

13. The method of claim 9, wherein the portions of the current garbage collection workload are sorted such that garbage collection of a write cache is prioritized.

14. The method of claim 13, wherein the write cache is a single-level-cell (SLC) write cache.

15. The method of claim 9, wherein deriving the metric from the idle times includes calculating a ratio between idle time and busy time for the memory device.

16. The method of claim 9, wherein performing the first portion of the portions at a next idle time includes verifying that the first portion is beyond the threshold size based on the metric.

17. A non-transitory machine-readable medium including instructions to implement dynamically adjusted garbage collection workload, the instructions, when executed by processing circuitry, cause the processing circuitry to perform operations comprising:
recording idle times for a memory device;
deriving a metric from the idle times including computing a weighted average of the idle times, the weighted average computed by:

$$\sum_{i=1}^{n} \frac{L_i}{i}$$

where, n is a number of idle times being considered and L is a length of an idle time;
dividing a current garbage collection workload into portions based on the metric, wherein the portions are atomic and a group of multiple operations, a size of the group being determined by the metric; and
performing, to completion, a first portion of the portions at a next idle time, wherein the first portion is beyond a threshold size.

18. The machine-readable medium of claim 17, wherein deriving the metric from the idle times includes using a contiguous subset of all idle times that includes a last idle time.

19. The machine-readable medium of claim 17, wherein deriving the metric from the idle times includes calculating an idle rate.

20. The machine-readable medium of claim 19, wherein the idle rate is determined from an input-output event counter of the memory device.

21. The machine-readable medium of claim 17, wherein the portions of the current garbage collection workload are sorted such that garbage collection of a write cache is prioritized.

22. The machine-readable medium of claim 21, wherein the write cache is a single-level-cell (SLC) write cache.

23. The machine-readable medium of claim 17, wherein deriving the metric from the idle times includes calculating a ratio between idle time and busy time for the memory device.

24. The machine-readable medium of claim 17, wherein performing the first portion of the portions at a next idle time includes verifying that the first portion is beyond the threshold size based on the metric.

* * * * *